(12) United States Patent  (10) Patent No.: US 8,226,249 B2
Chapman et al.  (45) Date of Patent: Jul. 24, 2012

(54) METALLIZED RETROREFLECTIVE SHEETING WITH INCREASED DAYTIME BRIGHTNESS

(75) Inventors: Steven R. Chapman, Glenview, IL (US); Feng Wu, Lake Zurich, IL (US); Kejian (Kevin) Huang, Buffalo Grove, IL (US)

(73) Assignee: Avery Dennison Corporation, Pasadena, CA (US)

(*) Notice: Subject to any disclaimer, the term of this patent is extended or adjusted under 35 U.S.C. 154(b) by 0 days.

(21) Appl. No.: 13/044,711

(22) Filed: Mar. 10, 2011

(65) Prior Publication Data

US 2011/0159179 A1  Jun. 30, 2011

Related U.S. Application Data

(62) Division of application No. 12/202,739, filed on Sep. 2, 2008, now Pat. No. 7,922,344.

(51) Int. Cl.
*G02B 5/124* (2006.01)

(52) U.S. Cl. ...... 359/530; 359/529; 359/900; 427/163.1

(58) Field of Classification Search .......... 359/529–542; 427/163.1
See application file for complete search history.

(56) References Cited

U.S. PATENT DOCUMENTS

| 5,272,562 | A | 12/1993 | Coderre |
| 5,940,212 | A | 8/1999 | Johnson et al. |
| 6,168,275 | B1 | 1/2001 | Benson et al. |
| 6,258,443 | B1 | 7/2001 | Nilsen et al. |
| 6,770,225 | B2 | 8/2004 | Nilsen et al. |
| 7,142,767 | B2 | 11/2006 | Gardiner |
| 2003/0102591 | A1* | 6/2003 | Thielman et al. ............. 264/166 |
| 2008/0212181 | A1* | 9/2008 | Wu .............................. 359/530 |

FOREIGN PATENT DOCUMENTS

| EP | 0991964 | 8/2002 |
| WO | 95/11470 | 4/1995 |
| WO | 99/23516 | 5/1999 |
| WO | 00/42454 | 7/2000 |
| WO | 2005/069045 | 7/2005 |

OTHER PUBLICATIONS

International Search Report and Written Opinion issued in corresponding International Application No. PCT/US2009/054126 dated Nov. 16, 2009.
International preliminary report on patentability issued in corresponding International application PCT/US2009/054126 dated Mar. 17, 2011.

* cited by examiner

*Primary Examiner* — James Phan
(74) *Attorney, Agent, or Firm* — Avery Dennison Corporation (57) ABSTRACT

A retroreflective sheeting (10) comprising a cube layer (20) having a front light-receiving surface (30) and a rear retroreflecting surface (32), and a metallic layer (22) covering the rear retroreflecting surface (32). The rear surface (32) comprises an array of retroreflective elements (34) and diffusing patches (36) within such array (without retroreflective elements (34)). The metallic layer (22) covers the retroreflective elements (34) and the diffusing patches (36), whereby diffusing patches (36) scatter incoming light increasing daytime brightness to a desired level.

13 Claims, 7 Drawing Sheets

METALLIZED RETROREFLECTIVE SHEETING WITH INCREASED DAYTIME BRIGHTNESS

CROSS-REFERENCE TO RELATED APPLICATION

The present application is a division of U.S. Application Ser. No. 12/202,739 filed Sep. 2, 2008, now U.S. Pat. No. 7,922,344, which is incorporated herein by reference in its entirety.

FIELD OF THE INVENTION

The present invention relates to retroreflective sheeting that has a cube layer and metallic layer covering the rear retroreflecting surface of the cube layer and a diffusing patch area.

BACKGROUND OF THE INVENTION

Retroreflective sheeting can comprise a thermoplastic cube layer having a front light-receiving surface and a rear retroreflecting surface. Light incident on the front surface passes through the transparent thermoplastic layer, impinges on the rear retroreflecting surface, and is reflected back out through the front surface in a predetermined direction (e.g., aligned with and/or parallel to the direction of incidence). In this manner, incident light can be used to illuminate markings, words, and other information in an otherwise dark environment.

In certain situations, the sheeting's visibility and/or conspicuity during daylight hours is important. If so, the retroreflective sheeting must possess sufficient daytime brightness. This brightness feature can be described in terms of the second of the tristimulus coordinates (X,Y,Z) and is often referred to as "cap-Y." A day time brightness (or cap-Y) scale ranges from 0 for a perfectly black material to 100 for a perfectly white material.

BRIEF SUMMARY OF THE INVENTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

The disclosed retroreflective sheeting comprises an array of retroreflective elements, at least one diffusing patch within the array, and a metallic layer covering both the retroreflective elements and the diffusing patch(es). The diffusing patch or patches scatters incoming light thereby increasing daytime brightness to a desired level. Without the diffusing patches, such metallized sheeting might have a high retroreflectance, but it would have a low daytime brightness and would appear dark or grayish during daylight hours.

Diffusing patches can have different shapes, such as squares, hexagons, rectangles and triangles. Within a patch there can be an internal perimeter, e.g., a square which can be a solid patch or a hollow frame patch with patches. A continuous pattern can be created from connected shapes. In this case, multiple shapes can comprise a single patch.

In one exemplary embodiment retroreflective sheeting is described and includes a cube layer that has a front light-receiving surface and a rear retroreflecting surface and a metallic layer covering the rear retroreflecting surface. The retroreflective rear surface of the cube layer includes an array of retroreflective elements that have at least one diffusing patch within such array without retroreflective elements. The metallic layer covers the retroreflective elements and the diffusing patch.

In a still further exemplary embodiment of the presently described invention, a method of making the retroreflective sheeting is described and includes the steps of initially embossing a thermoplastic film with a tool plate and then cooling the embossed thermoplastic film. The tool plate has a topography that corresponds to the inverse of reflective elements and the diffusing patches.

In a yet still further exemplary embodiment of the presently described invention, a method of making the tool plate, includes the steps of initially providing a substrate that has a topography with forming elements which corresponds to an array of the retroreflective elements. Next, the patch-location regions are charted, so as to correspond to a desired brightness and brightness, in the topography. The patch-location regions are then modified to remove the forming elements therein.

In a still further exemplary embodiment of the presently described invention, a tool plate for embossing a thermoplastic film is described and used to make the cube layer of the retroreflective sheeting. The tool plate has a topography that corresponds to the inverse of the array of the retroreflective elements and the diffusing patches that is to be formed on the retroreflective sheeting.

These and other objects of the invention will become clear from an inspection of the detailed description of the invention and from the appended claims.

BRIEF DESCRIPTION OF THE DRAWINGS

These, as well as other objects and advantages of this invention, will be more completely understood and appreciated by referring to the following more detailed description of the presently preferred exemplary embodiments of the invention in conjunction with the accompanying drawings, of which.

DETAILED DESCRIPTION OF THE INVENTION

The present invention is now illustrated in greater detail by way of the following detailed description which represents the best presently known mode of carrying out the invention. However, it should be understood that this description is not to be used to limit the present invention, but rather, is provided for the purpose of illustrating the general features of the invention.

Referring now to the drawings, and initially to FIG. 1A through FIG. 1J, retroreflective sheeting 10 is shown incorporated into a variety of end products 12. The end product can comprise, for example, a vehicle part (FIG. 1A), an informational sign or signage, (FIG. 1B), a traffic barrel (FIG. 1C), a clothing article (FIG. 1D), a license or registration plate (FIG. 1E), a location marker (FIG. 1F), a flag (FIG. 1G), a banner (FIG. 1H), a tape strip (FIG. 1I), a decal or sticker (FIG. 1J), and/or any other component or end product where retroreflectivity is necessary or desired. In any event, the end product 12 can include a mounting surface 14 to which the sheeting 10 is attached (e.g., adhesively attached).

Figures 1A, 1B, 1C:
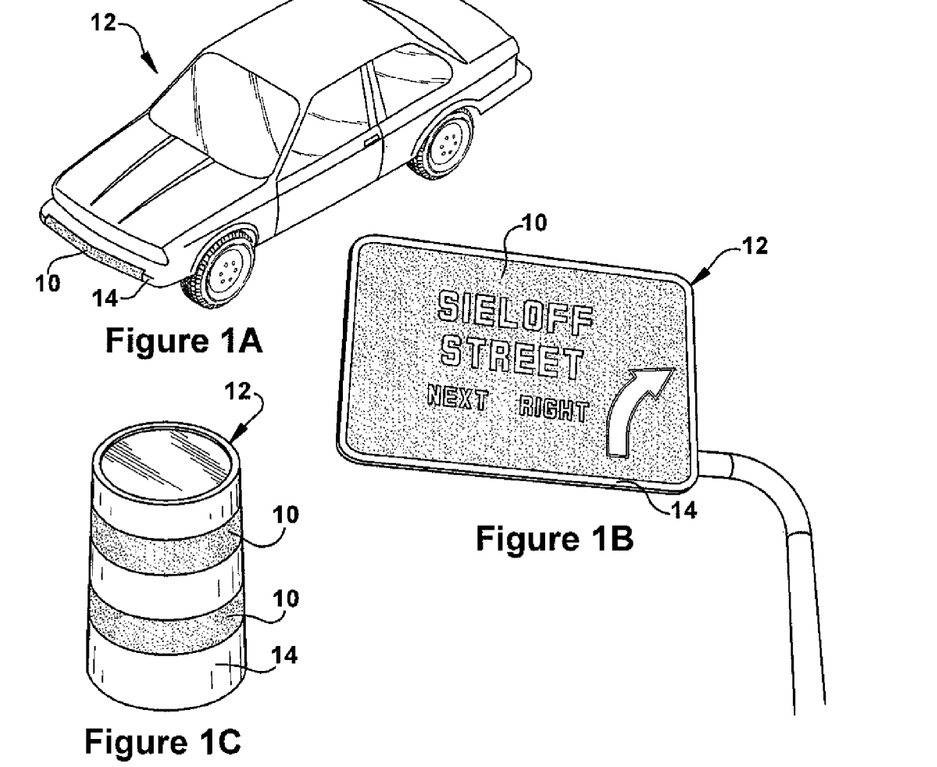
FIGS. 1A-1J are each schematic drawings of an end product incorporating retroreflective sheeting.
Figure 1D:
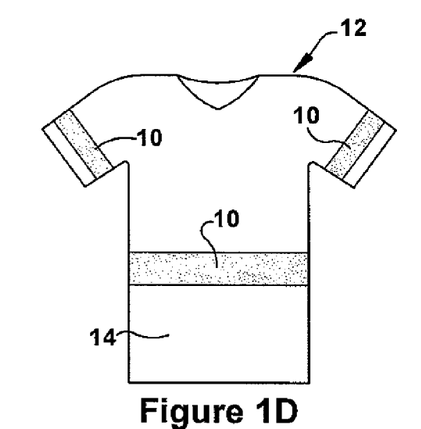
Figure 1E:
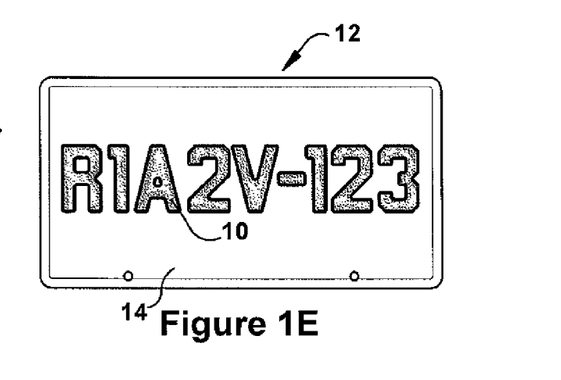
Figure 1F:
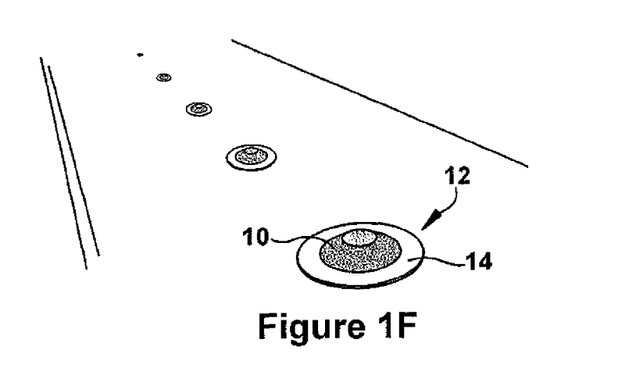
Figure 1G:
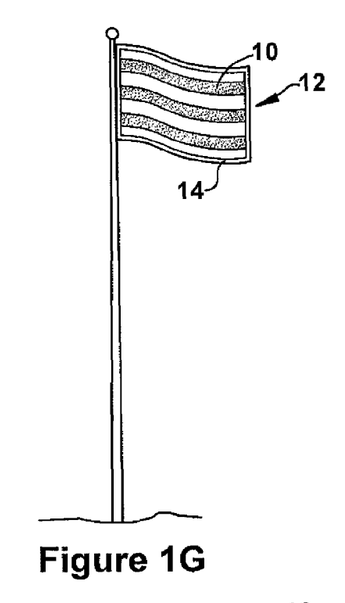
Figure 1H:
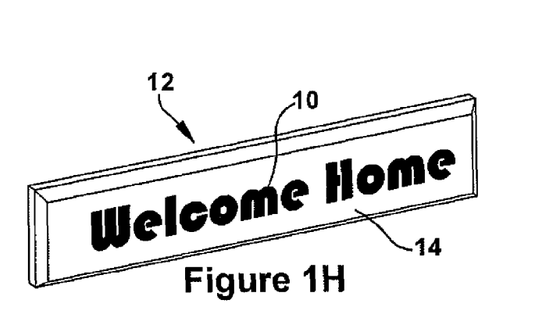
Figure 1I:
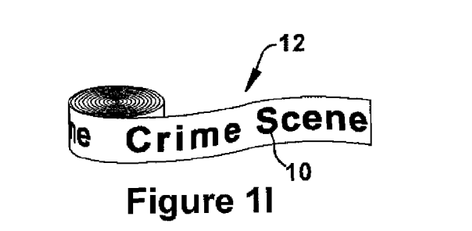
Figure 1J:
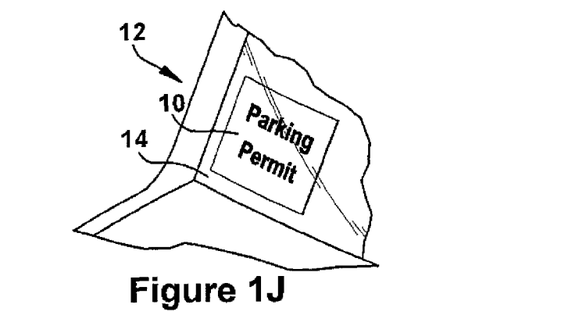
Figure 2A:
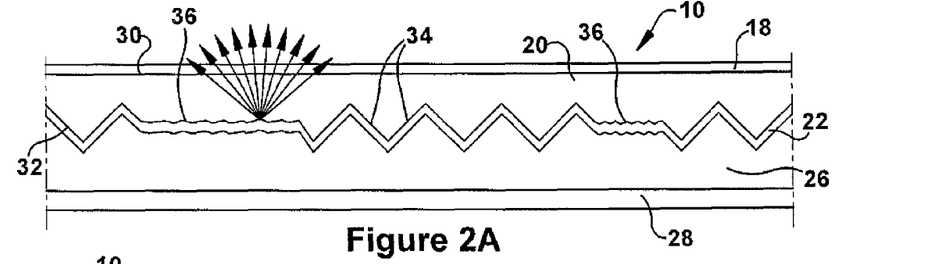
FIGS. 2A-2G are each isolated views of the retroreflective sheeting.
Figure 2B:
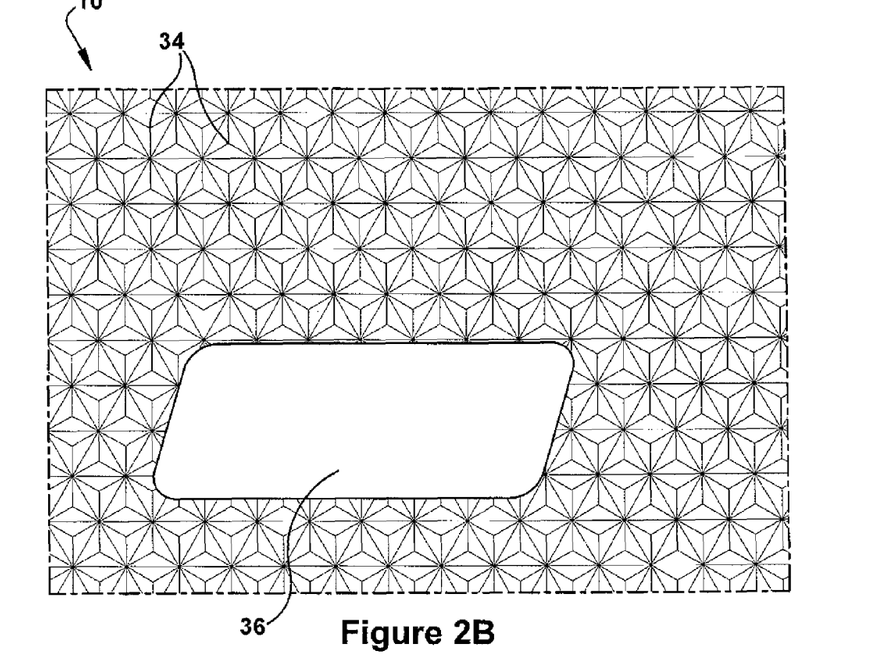

Referring now to FIGS. 2A and 2B, the retroreflective sheeting 10 is shown isolated from the end product 12. The illustrated sheeting 10 can comprise a UV-resistant or protective layer 18, a cube layer 20, a metallic layer 22, an adhesive layer 26, and a removable release layer 28, such as a silicone coated release material. Depending upon the intended application of the sheeting 10, the UV-resistant layer 18, the adhesive layer 26, and/or the release layer 28 may be omitted or replaced in some sheeting constructions. And additional layers may be necessary or desired in certain circumstances.

The UV-resistant or protective layer 18 can be a transparent layer made of thermoplastic material with appropriate resisting properties or coatings. The cube layer 20 can comprise any suitable thermoplastic material which is compatible with desired manufacturing methods (e.g., acrylic, vinyl, polymethyacrylate, polycarbonate, polyurethane, polysulfone, polyarylate, polyether imide, polyetherimide, cyclo-olefinic copolymer, and/or acrylonitrile butadiene styrene).

The metallic layer 22 can be a metallized film, granular particles, or any other acceptably reflective metallic material. The metallic layer 22 can be, for example, an aluminum or coating of vaporized metal (e.g., aluminum, silver) that is deposited onto the rear surface. A suitable primer (e.g., titanium metal sputter) can be used to enhance vapor-deposition adhesion to the rear surface 32.

The adhesive layer 26 (e.g., a pressure-sensitive or heat-activated adhesive layer) can be used to attach the reflective sheeting 10 to the mounting surface 14. The removable release layer 28 can be provided to cover the adhesive layer 26 during premounting stages of end product fabrication.

The cube layer 20 has a front light-receiving surface 30 and a rear retroreflective surface 32. Light incident on the front surface 30 passes through the cube layer 20, impinges on the rear retroreflective surface 32 and reflects back out through the front surface 30 in a predetermined direction. This predetermined direction can be aligned with and/or parallel to the direction of light incidence.

The rear retroreflective surface 32 comprises an array of retroreflective elements 34 and at least one diffusing patch 36 dispersed there within. The metallic layer 22 (e.g., a metallized film) covers the rear retroreflective surface 32 and covers both the retroreflective elements 34 and the diffusing patch or patches 36. While FIG. 2B provides an illustration of only a single patch, it should be understood that multiple patches could be provided on the retroreflective sheeting. Each diffusing patch will preferably have a coverage area that is greater than the occupation area or area occupied by a plurality of retroreflective elements. The diffusing patch will not have any recognizable retroreflective elements as the elements 34 will have been obliterated, abraded as described herein.

Figure 2C:
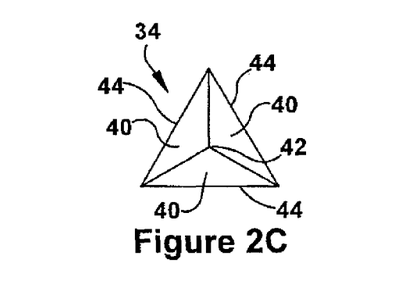
Figure 2D:
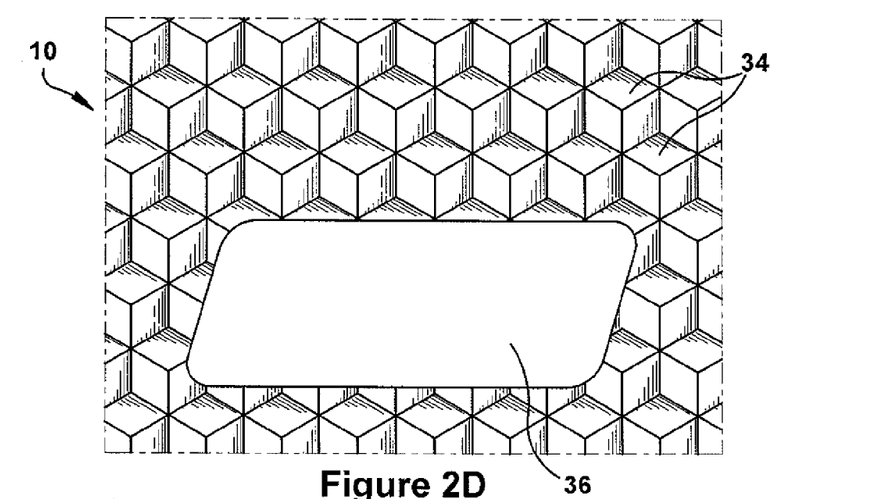
Figure 2E:
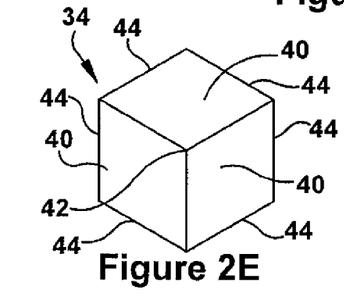
Figure 2F:
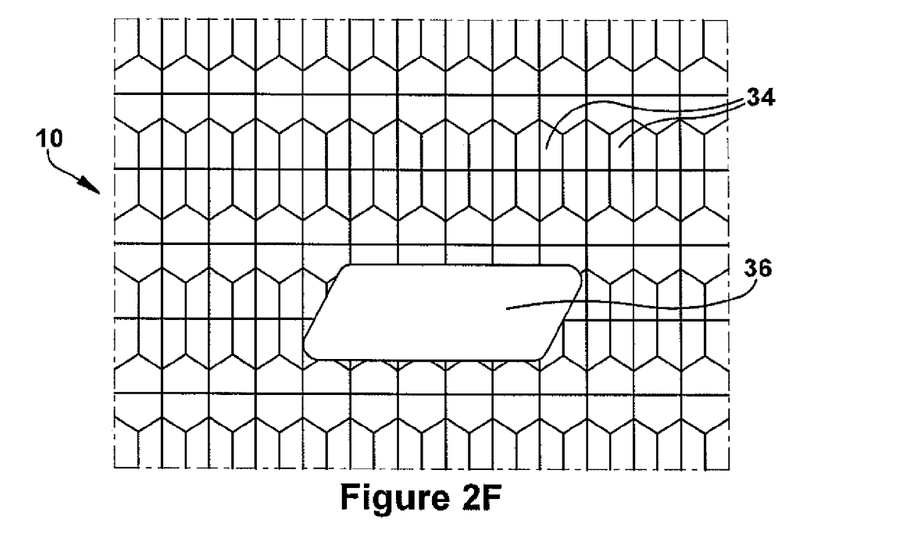
Figure 2G:
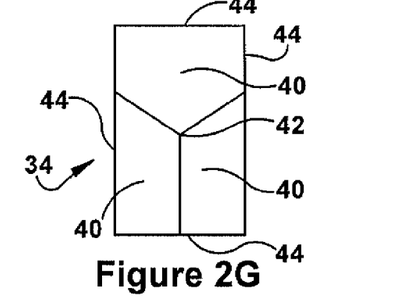

The retroreflective elements 34 can be cube corner elements. Each cube corner comprises three approximately mutually perpendicular optical faces 40 that intersect at a cube apex 42. The retroreflective elements 34 can be triangular cube corners (FIGS. 2B and 2C), or hexagonal cube corners (FIGS. 2D and 2E), or rectangular cube corners (FIGS. 2F and 20) or other cube shapes. The edges of the faces 40 that do not intersect with apex 42 can be called perimeter edges 44. The area enclosed by the perimeter edges 44 in plan view, can be about 1 mm$^2$ or less. If so, the elements 34 can be considered micro-optical elements (e.g., microcubes). The coverage area of the diffusing patch 36 has an outer perimeter having sections parallel with the perimeter edges 44 of the retroreflective elements 34. The outer perimeter's linear sections are aligned with the perimeter edges 44 of surrounding retroreflective elements 34.

The diffusing patch 36 scatters incoming light thereby increasing daytime brightness to a desired level. Without the diffusing patch 36, the sheeting 10 could have a high retroreflectance, but it would have a low daytime brightness. For example, the retroreflective sheeting 10 would have a dark or grayish color during daylight hours. Each diffusing patch 36 can comprise a coverage area greater than the occupation area of a plurality of retroreflective elements 34. For example, two or more retroreflective elements 34 or ten or more retroreflective elements 34 could fit between the outer and inner perimeters of a hollow frame patch.

The coverage area of the diffusing patch has an inner perimeter and retroreflective elements 34 are positioned within this inner perimeter. The inner perimeter's linear sections are aligned with perimeter edges 44 of the retroreflective elements 34 surrounded by the inner perimeter. The inner perimeter has linear sections parallel with perimeter edges 44 of the retroreflective elements.

The diffusing patch 36 does not contain any recognizable retroreflective elements 36. The patch's topography differs significantly from a situation wherein individual retroreflective elements (and/or faces thereof) are aberrated, blunted, shortened, textured, or otherwise altered.

Figure 3A:
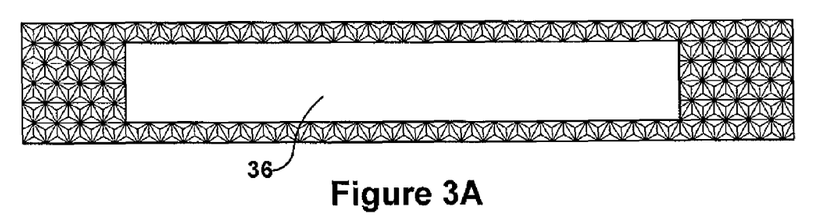
FIGS. 3A-3C are plan views of the retroreflective sheeting with different patch geometries.
Figure 3B:
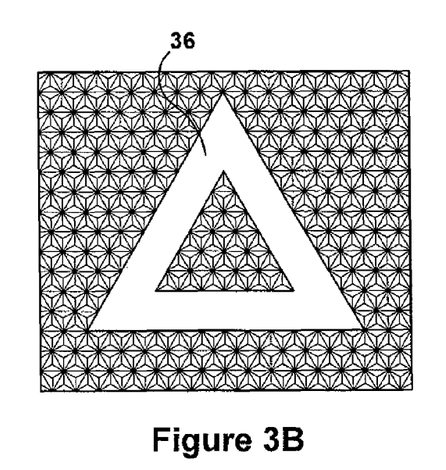
Figure 3C:
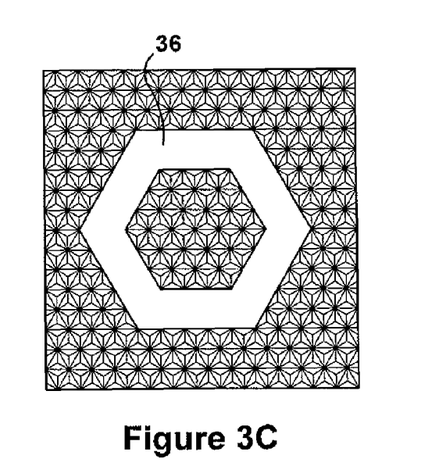

The patch geometry and/or its arrangement within the array can be selected so that less retroreflectivity is sacrificed for a given daytime brightness. The coverage area of the diffusing patch 36 can have a polygonal shape, such as a parallelogram-like shape (FIGS. 2B, 2D, and 2F), a rectangular shape (FIG. 3A), or a triangular shape (FIG. 3B), or a hexagonal shape (FIG. 3C). If the sheeting 10 contains a plurality of patches 36, they can have the same, similar or different shapes.

The coverage area of the diffusing patch 36 can have an outer perimeter having linear sections parallel with the perimeter edges (in plan view) of the retroreflective elements 34. More particularly, the outer perimeter's linear section can be aligned with the perimeter edges 44 of the surrounding retroreflective elements 34. (FIGS. 3A-3C.)

The coverage area of the diffusing patch 36 can occupy the entire area within the outer perimeter. (FIGS. 2B, 2D, 2F, and 3A.) Alternatively, the coverage area of the diffusing patch 36 can have an inner perimeter and retroreflective elements 34 positioned within this inner perimeter. (FIGS. 3B and 3C.) The inner perimeter can have linear sections parallel with perimeter edges 44 of the retroreflective elements 34 and/or aligned with the edges 44 of the retroreflective elements 34 surrounded by the inner perimeter. The inner perimeter may (or may not) be parallel with the outer perimeter.

Thus, the patches 36 can be sized, shaped, and/or arranged within the array to achieve the preferred level of brightness.

The diffusing patches 36 can accomplish daytime brightness without white pigment being printed or otherwise applied to the front surface 30 of the cube layer 20. This eliminates the time/cost associated with a pigment-printing step. And it also eliminates the need for a pigment-protection layer commonly applied over a printed cube layer 20. This reduces the number of sheeting layers and simplifies manufacturing steps.

If the retroreflective sheeting 10 is to be colored, such coloring can be incorporated into the cube layer 20. A separate color overlay layer (which is usually relatively thin) is not necessary. And thus the sheeting's coloring is carried by a thicker more durable layer.

Figure 4A:
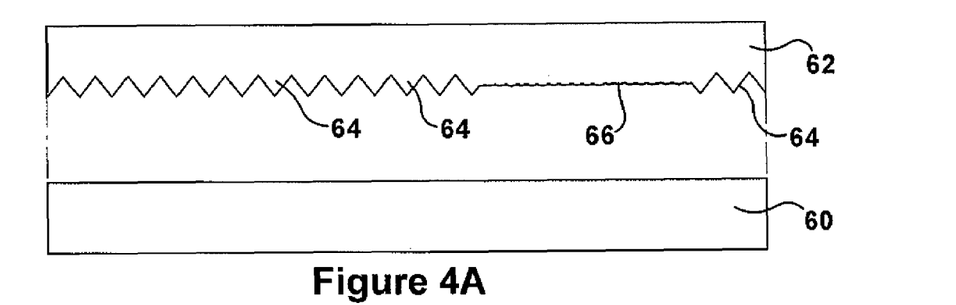
FIGS. 4A-4D are schematic views of a method of making the retroreflective sheeting.
Figure 4B:
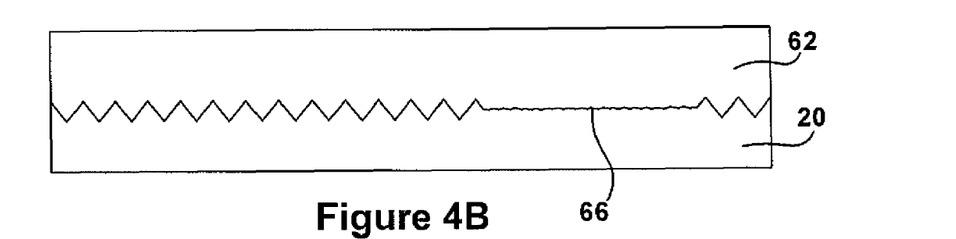
Figure 4C:
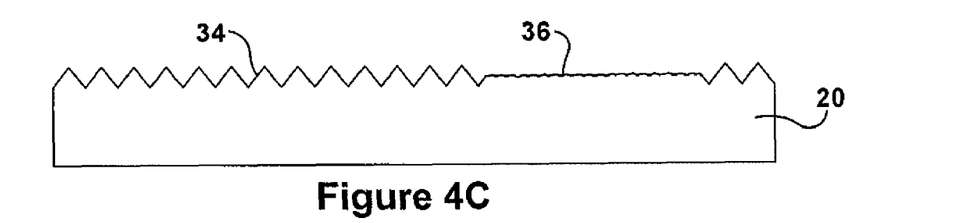
Figure 4D:
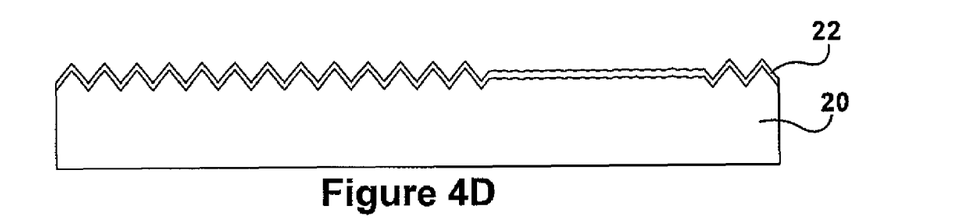

Referring now to FIGS. 4A and 4B, a method of making the cube layer 20 is schematically shown. In this method, a thermoplastic film 60 is embossed by a tool plate 62, and then cooled to solidify the embossed structure. The tool plate 62 has a topography corresponding to the inverse of the retroreflective elements 34 and the diffusing patch(es) 36. This creates an array of retroreflective elements 34 and diffusing patches 36 dispersed therewithin on the thermoplastic film 60 thereby forming the cube layer 20 and any additional layer (e.g., UV-resistant layer) is embossed together with the thermoplastic film 60. The metallic layer 22 can then be deposited or otherwise applied onto the rear surface 32 of the cube layer 20 (i.e., over both the retroreflective elements 34 and the diffusing patches 36). The remaining layers (e.g., adhesive layer 26, release liner layer 28, etc.) are then assembled to complete the retroreflective sheeting 10.

Figure 5A:
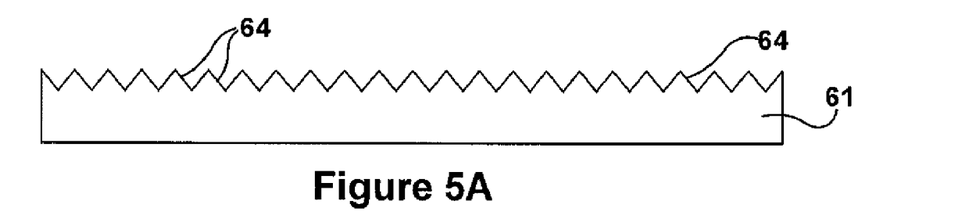
FIGS. 5A and 5B are schematic views of a method of making a tool for use in the method shown in FIGS. 4A-4D.
Figure 5B:
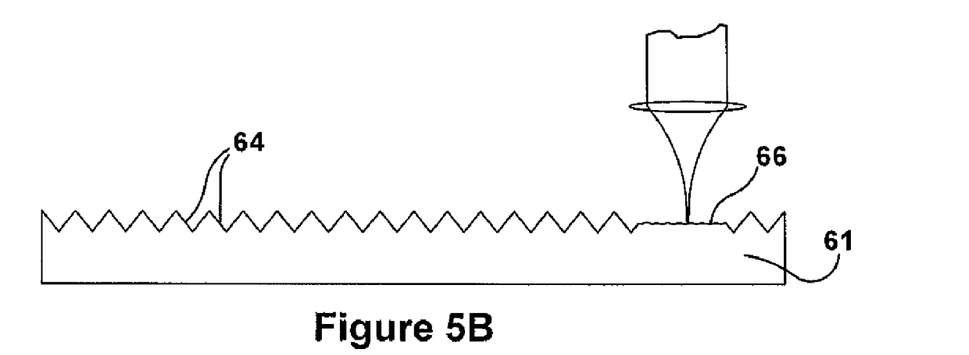

A method of making the tool plate 62 is shown schematically in FIGS. 5A and 5B. The embossing tool plate 62 can be made from tool plate 61, originally having a topography with forming elements 64 corresponding to a patch free array of the retroreflective elements 34. At some point in the process, patch-location regions can be charted that correspond to desired brightness. This charting and/or correspondence can be determined by mathematical formulae, experimental data, or other creditable techniques. As was discussed above, for certain array arrangements and/or patching procedures, less retroreflectivity will be sacrificed for a given geometry and/or daytime brightness.

Patch-location regions 66 on tool plate 61 (charted to correspond to a desired daytime brightness) are then modified to remove the forming elements 64 therein. This removal can be accomplished by a variety of means, including the application of energy, chemicals, pressure, or mechanical erosion. Energy can be applied, for example, as either electrical energy or focused heat, such as by an infra-red laser, which melts or otherwise disintegrates the affected elements 64. Acidic chemicals can be selectively administered to the to-be-etched regions to dissolve the elements 64. Pressure (with or without heat) can be concentrated to flatten and thereby destroy the forming elements 64. Engraving, cutting, particle-impingement, drilling, or other means can be employed to mechanically erode material within the patch-location region (s) 66. The tool plate 62 used for embossing can comprise the tool plate 61 or a copy or copies thereof.

One may now appreciate that the diffusing patch(es) 36 can be used to produce customized sheeting 10 by tailoring its brightness to specifications without using preprint.

The retroreflective sheeting of the presently described invention may find uses in a number of applications, including automotive and vehicle parts, signage and architectural panels, traffic barrels, clothing, license and registration plates, flags, banners, decals, pressure sensitive products.

It will thus be seen according to the present invention a highly advantageous retroreflective sheeting has been provided. While the invention has been described in connection with what is presently considered to be the most practical and preferred embodiment, it will be apparent to those of ordinary skill in the art that the invention is not to be limited to the disclosed embodiment, and that many modifications and equivalent arrangements may be made thereof within the scope of the invention, which scope is to be accorded the broadest interpretation of the appended claims so as to encompass all equivalent structures and products.

The inventors hereby state their intent to rely on the Doctrine of Equivalents to determine and assess the reasonably fair scope of their invention as it pertains to any apparatus, system, method or article not materially departing from but outside the literal scope of the invention as set out in the following claims.

What is claimed is:

1. A method of making the retroreflective sheeting (10) comprising the steps of:
   embossing a thermoplastic film (60) with a tool plate (62);
   cooling the embossed thermoplastic film (60); and
   wherein the tool plate (62) has a topography corresponding to the inverse of reflective elements (34) and the diffusing patches (36); and
   wherein the diffusing patches do not contain any retroreflective elements.

2. The method as set forth in claim 1, further comprising the step of applying the metallic layer (22).

3. The method as set forth in claim 2, wherein the metallic layer can be a metalized film, granular particles or other metallic material.

4. The method as set forth in claim 1, including a further step of applying an adhesive layer after the step of cooling.

5. The method as set forth in claim 1, wherein the diffusing patches are created by abrading, texturing, blunting or obliterating the retroreflective elements.

6. The method as set forth in claim 1, wherein the retroreflective elements are cube corner elements.

7. The method as set forth in claim 6, wherein the cube corner elements can be triangular, hexagonal or rectangular.

8. The method as set forth in claim 6, wherein the cube corner elements are microcubes having a size of about 1 mm$^2$ or less.

9. The method of claim 1, wherein each of the diffusing patches has a coverage area greater than an occupation area of a plurality of retroreflective elements.

10. The method of claim 9, wherein the occupation area is equal to at least two retroreflective elements.

11. The method of claim 9, wherein the occupation area is equal to at least ten retroreflective elements.

12. The method of claim 1, including a further step of applying a UV resistant layer prior to the step of embossing.

13. The method of claim 12, wherein the UV resistant layer and the thermoplastic film are embossed together.

* * * * *